Feb. 24, 1948. L. E. RAUSENBERGER 2,436,669
DRIVE UNIT
Filed Nov. 13, 1943 2 Sheets-Sheet 1
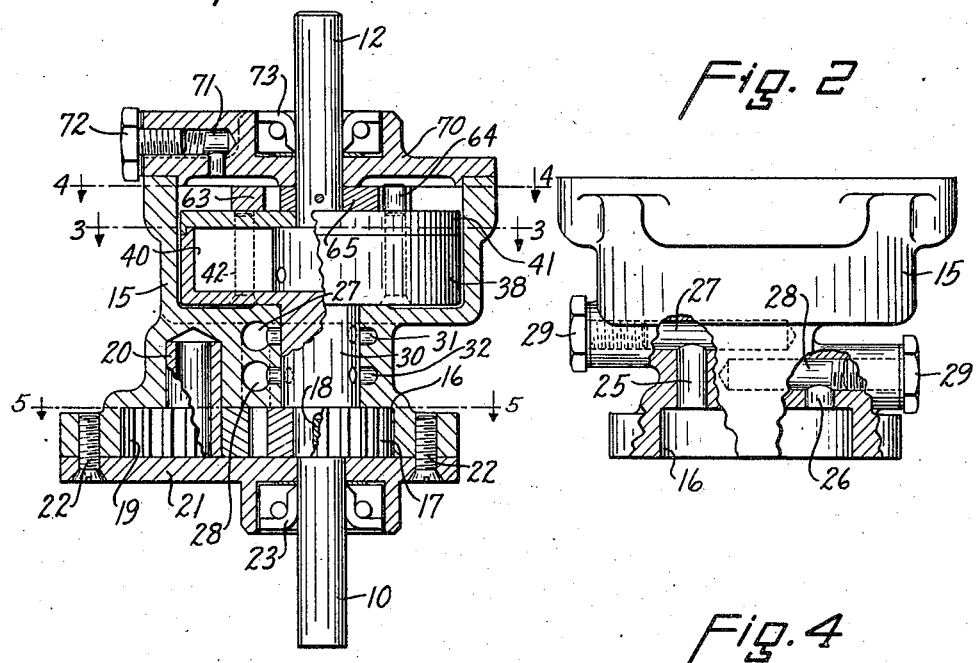
Inventor
Lawrence E. Rausenberger
By Marshal & Biebel
Attorneys Feb. 24, 1948.   L. E. RAUSENBERGER   2,436,669
DRIVE UNIT
Filed Nov. 13, 1943   2 Sheets-Sheet 2
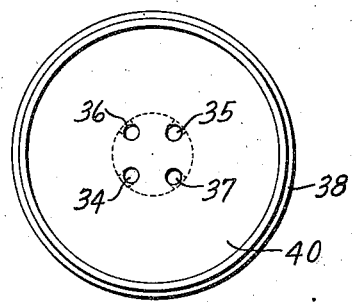
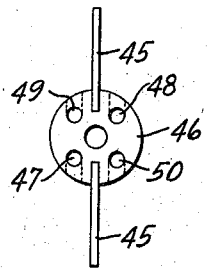
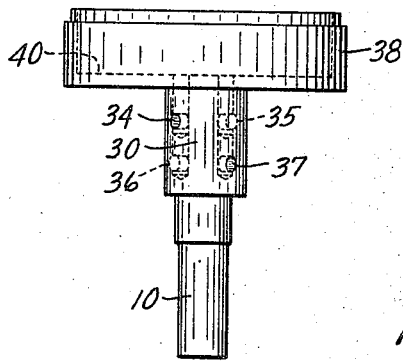
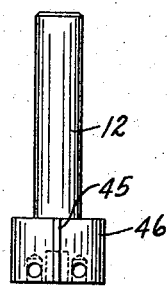
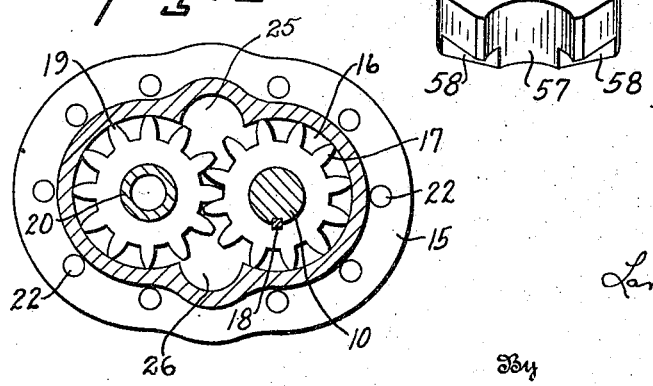

Patented Feb. 24, 1948

2,436,669

UNITED STATES PATENT OFFICE 2,436,669

DRIVE UNIT

Larence E. Rausenberger, Springfield, Ohio, assignor to The Steel Products Engineering Company, Springfield, Ohio, a corporation of Ohio Application November 13, 1943, Serial No. 510,123

13 Claims. (Cl. 64—25)

This invention relates to control mechanism and more particularly to a drive unit for producing a predetermined angular change in the regulation of relatively rotating elements.

It is the principal object of the invention to provide a simple and effective coupling unit for effecting a driving relation between drive and driven elements and through which there is produced a desired change in the phase relation of the driven element with respect to the drive element in accordance with the speed of operation thereof.

It is also an object to provide such a control which responds to a change in the speed of operation of the drive element to provide a shift in the phase relation of the driven element in correlated relation with respect thereto.

It is a further object to provide a simple hydraulic mechanism for coupling a driving and driven member and producing a desired change in the relative relation of the two elements by an added increment of velocity in accordance with an increase in the speed of operation of the drive element.

It is a still further object to provide a hydraulic unit adapted for use with an aircraft gun turret fire control mechanism for preventing the firing of the gun when in danger of firing into any part of the aircraft, the hydraulic unit providing a selective range of protective action depending upon the actual speed at which the turret is operating so that the protected range in which the gun is prevented from firing is kept to the minimum value consistent with safety.

Other objects and advantages will be apparent from the following description, the accompanying drawings and the appended claims.

In the drawing:

Fig. 1 is a vertical sectional view through the hydraulic or fluid drive unit constructed in accordance with the present invention;

Fig. 2 is a view through the main body of such unit partly in elevation and partly in section, taken at right angles to the section shown in Fig. 1;

Fig. 3 is a horizontal sectional view on the line 3—3 of Fig. 1;

Fig. 4 is a horizontal sectional view on the line 4—4 of Fig. 1;

Fig. 5 is a horizontal sectional view through the pump chamber on the line 5—5 of Fig. 1;

Fig. 6 is a view in side elevation of the fluid chamber carried at the upper end of the drive shaft;

Fig. 7 is a plan view looking down into the fluid chamber of Fig. 6;

Fig. 8 is a view in perspective of one of the stop members used in the fluid chamber;

Fig. 9 is a view from the lower end of the vane member which is provided in the fluid chamber and of the driven member; and Fig. 10 is a view in side elevation of the vane and its relation to the driven shaft.

In a gun turret fire control mechanism as used on aircraft in particular it is necessary to provide some means for preventing the firing of the gun when the gun is directed so that any parts of the aircraft itself are within the line of fire. This is particularly important with types of turrets in which the guns can be trained through a full 360° in azimuth, and through a full range from vertical position to something below the horizontal position in elevation. In such case it is necessary to provide protection so that the gun will not be accidentally fired in any position in which it might produce damage to any parts of the aircraft.

This protection is afforded by a fire control mechanism which is properly oriented with respect to the position of the gun in elevation and in azimuth and which disables the fire of the gun whenever it is moved into a critical position. It will be appreciated that while this protection is necessary, it becomes important to limit the range in which the gun is ineffective, as much as possible, so to avoid having any substantial unprotected area into which the fire of the gun cannot be directed.

Where the gun is subjected to rapid or high speed traverse, it is found that the range within which this protective action is necessary must be substantially broader than when the gun is fired from a stationary position, or when moving slowly. That is, with the gun rapidly rotating in azimuth for example, and assuming it to be directed at such an elevation that it would swing across the tail of the airplane, the gun action must be disabled under a substantially wider range of angles when it is moving rapidly across the tail, than when it is only moving slowly or held substantially stationary. Obviously if the protective range of the fire control mechanism is fixed, it must be made sufficiently large to protect the tail at the maximum rate of traverse of the gun, and this requires an excessive angle of protection into which the gun cannot fire, even though when substantially stationary the fire could be brought much closer to the tail without danger of damage.

The present invention is particularly adapted for use with such a fire control mechanism. It provides for the control of the driven element of the fire control mechanism, to provide an automatic increase in the angular protection provided by the fire control mechanism in accordance with the speed of rotation of the gun. One such unit is adapted to be incorporated in the drive for the fire control mechanism for the gun elevation, and another for the azimuth position of the gun. The range of protection afforded by the fire control mechanism itself is made a minimum, so that with the gun being held stationary or moved very slowly its fire can be directed as close to the several parts of the aircraft as practicable, and the range of ineffectiveness of the gun is therefore reduced to a minimum. However when the gun is subjected to rapid traverse, in either azimuth or elevation, the range of protection developed by the fire control mechanism is increased, in proportion to the speed of such traverse and to the extent required to afford proper protection for the rapidly moving gun.

While primarily adapted for application to such gun turret and fire control mechanism, the invention is also of more general application wherever it is desired to operate a driven element from a drive element, and to effect a change, either an increase or a decrease in the phase angle relation of the driven element with respect to the driving element in accordance with the speed of operation there. Thus as shown and described herein, the unit is operable in either direction of rotation of the drive element, and is effective to bring about an advance in the phase angle relation of the driven element with respect to the drive element, in whichever direction the elements are caused to rotate; however, the same invention also may be readily adapted for bringing about a corresponding and proportional change in the angular relationship by decreasing the phase angle of the driven element with respect to the drive element. For purposes of illustration and to enable the invention to be properly understood, it will be hereinafter set forth in its preferred form and as particularly developed for use with such fire control apparatus.

Referring to the drawing which discloses a preferred embodiment of the invention, the drive shaft is shown at 10, and the driven shaft at 12. In the case of its application to a gun turret, shaft 10 will be coupled to rotate with the gun turret, it being understood that one such shaft is related to the motion of the gun in elevation, and the corresponding shaft of a second unit being related to the position of the gun in azimuth. Shaft 12 of each unit is coupled to the fire control mechanism itself which controls the disabling of the firing mechanism of the gun, so that the unit of this invention is in effect interposed in the normal drive chain between the gun turret and the fire control mechanism. Since the two units are duplicates, only one need be described.

The unit comprises a housing 15 which at the lower end is recessed to provide a pump chamber 16. A pump gear 17 is keyed to the shaft 10 by key 18 and meshes with a cooperating pump gear 19 rotatbly mounted upon bearing member 20 fixed in the housing. A cover plate 21 is fastened to the housing by means of bolts 22, providing a closure for the pump character. It also provides a support for the sealing elements 23 which are provided to seal the shaft with respect to the housing.

The body of the housing 15 is cored at opposite sides of the meshing faces of the gears to provide spaced upwardly extending passages 25 and 26. These passages communicate with upper horizontally extending passage 27 and lower horizontally extending passage 28, respectively. Clean out plugs 29 close both passages and provide access for cleaning when necessary. Fluid flows from the pump into passages 25 and 27 and returns through passages 28 and 26 in one direction of rotation and in the reverse direction upon opposite rotation of shaft 10.

An enlarged shank portion 30 is formed on shaft 10 and a series of equally spaced passages are formed in the shank for cooperation with open faced annular passages 31 and 32, communicating respectively with passages 27 and 28. Thus one pair of openings 34 and 35 is located at the level of the upper passage 31 and on opposite sides of the shank. A second pair of openings 36 and 37 is located at the level of the lower passage 32, and also on opposite sides of the shank. Each of the four openings communicates with an upwardly extending passage in the shank which leads into the bottom of an annular shaped member 38 which forms a fluid drive chamber 40. A cover 41 is fitted in fluid sealed relation over the edge of the member 38, and is secured thereto by means of bolts 42. The member 38 is thus mounted for free rotation within a recess in the housing to rotate with drive shaft 10, and is preferably formed as an integral part of shaft 10.

Within the closed fluid chamber 40 thus provided there is mounted a vane 45 which is supported by an enlarged shank portion 46 formed at the lower end of the driven shaft 12. The lower face of shank 46 rests against the upper face of shank portion 30, and two pairs of apertures 47 and 48, and 49 and 50 are arranged to register with the corresponding apertures 34 and 35, and 36 and 37 respectively. Passages are formed in the side walls of shank 46 so that the fluid passed through the shank 30 has free access into and out of the interior of the chamber 40. Also since the driven shaft has angular movement relative to the driving shaft, it will be noted that the several openings 47 to 50 are made sufficiently large so that they will continue to overlap and register with the corresponding openings 34 to 37 throughout all relative positions of these two elements.

It will be understood from the above that one pair of apertures 47 and 48 for example is adapted to introduce fluid from one side of the pump, and at the pressure as developed by the pump to correspondingly opposite sides of vanes 45. At the same time the fluid on the opposite sides of vanes is permitted to discharge through the opposite pair of openings 49 and 50 through the return path to the opposite side of the pump. This system is normally substantially filled with fluid such as a light oil. Thus when the drive shaft 10 rotates, the fluid chamber 40 rotates directly therewith, and because the chamber is filled with fluid, the vanes 45 are also rotated in the same direction. Shaft 12 is thereby driven at the same speed as drive shaft 10. However as a result of the rotation of shaft 10, the pump is actuated and additional fluid is supplied through passages 25, 27, 31, 34 and 35 into the chamber 40 on diagonally opposite sides of vane 45, while fluid is withdrawn from the remaining opposite faces of the vanes and flows back through passages 36 and 37, 32, 28 and 26 to the return or low pressure side of the pump. This results in causing vane 45 to advance from its initial or neutral position as shown in Fig. 3 in the direction of its rotation through an angle corresponding to the additional pressure established in the vane chamber 40, and hence in proportion to the speed at which the pump and shaft 10 are operating, this pressure increasing upon an increase in speed. As will be clear, in case it is desired to retard the driven element upon an increase in speed of the drive element, it is only necessary to reverse the fluid supply, such as by connecting the discharge side of the pump to the lower passage 28 rather than to upper passage 27.

In order to limit the maximum phase change which can be developed, the fluid chamber 40 is provided with a pair of segment shaped stops 55 which are bolted as shown at 42 to the inside of the chamber. The blocks have a central arcuately shaped recess 57 for receiving the shank 46, and at the lower sides are provided with a cut-out recess 58 to assure the free flow of fluid into the chamber from the several openings 47 and 50, the cuts 58 being deep enough to assure the maintenance of free flow throughout all relative positions of the two shafts.

It will be clear that the size of these stops may be varied to provide for different maximum degrees of angular phase change, and if desired fluid may be supplied to only one side of the vane to thus provide for approximately a full turn of the vane where desired.

When the fluid is supplied to one or the other of the vanes, the vanes are progressively advanced away from the neutral position indicated in Fig. 3, and up to a maximum position where they rest against the stops as indicated in dotted lines. There is some leakage of liquid around the vanes at all times, and this leakage tends to balance the fluid supply from the pump where for example the gun is rotated slowly so that the rotation of the gun at a constant speed causes the vanes to reach an equilibrium point at a definite angle of advance, which is held substantially uniform unless the speed and correspondingly the pump pressure either increase or decrease. The operation of the vanes against the stops in response to high speed rotation tends to provide clearance at the outer periphery of the vanes adjacent the walls of the fluid chamber thus maintaining the vanes in maximum position while permitting flow of the liquid without developing a dangerous or excessive pressure.

In order to provide for restoration of the driving and driven shafts to their normal phase relation upon a decrease of the supply of fluid from the pump and also to provide a graduated force for balancing the fluid pressure and thereby retaining the vanes at different relative positions away from the neutral position, resilient means are positioned on the top cover 41 of the fluid chamber. This cover is formed with an upwardly extending annular flange 60 over which there is received an annular spring member 62 having at one end a tongue 63 adapted to be fitted into a gap in the flange 60. The spring is open at its end opposite tongue 63 to receive between its opposite faces a drive pin 64 which is fastened to the cover plate 41 and hence rotatable with the drive shaft. Key 65 is received over shaft 12 and pinned thereto by pin 66 so that it is rotatable with the driven shaft. Key 65 has a tongue 67 which also extends between the two opposite faces of spring 62. It will thus be seen that when the vane within the fluid chamber is caused to advance with respect to the chamber itself, tongue 67 engages one face of spring 62 while the other face is held in fixed position by pin 64. Thus one-half of spring 62 is expanded and a restoring force is thus developed within the spring which is available to provide for return of the parts to the normal position in the absence of fluid pressure within the chamber 37. Obviously upon the reverse rotation of the drive shaft and the advance of the driven shaft in the opposite direction with respect to the drive shaft, tongue 67 will engage the opposite half of spring 62 and energy will then be stored in that portion of the spring in the same manner. In both cases the force varies in amount in direct relation to the angle of phase change developed in vane chamber 40.

A top cover member 70 is received over the housing 15 and is suitably secured in place thereon. The top cover member is formed with an oil passage 71 which is closed by an oil filler plug 72 which is removable when it is desired to supply additional oil or fluid to the system. The cover member 70 also includes a shaft seal 73 for sealing shaft 12.

The invention thus provides a fluid drive unit which is extremely simple and compact in construction, and in which in operation provides for developing a desired degree of annular shift in the phase relation of a driving and a driven shaft, the extent of such phase change being in direct proportion to the speed at which the shaft is operating.

While the forms of apparatus herein described constitute preferred embodiment of the invention, it is to be understood that the invention is not limited to these precise forms of apparatus, and that changes may be made therein without departing from the scope of the invention which is defined in the appended claims.

What is claimed is:

1. A hydraulic unit for coupling a drive shaft and a driven shaft and including means driven by said driving shaft for developing a fluid pressure varying in accordance with the speed of said drive shaft, a fluid chamber, a vane in said chamber, means for connecting said chamber to one of said shafts and said vane to the other of said shafts, and means for supplying said fluid under pressure to the space between said vane and said chamber to effect a change in the relative relation of said driving and driven shafts in accordance with the speed of rotation of said drive shaft.

2. A control system for effecting a phase advance of a driven shaft with respect to a driving shaft in accordance with the speed of operation of said driving shaft including means for developing a fluid pressure varying in accordance with the speed of said driving shaft, a fluid coupling element for interconnecting said driving shaft and said driven shaft, and means for supplying said fluid pressure to said fluid coupling to effect a change in the phase relation of said driven element with respect to said drive element proportional to said fluid pressure.

3. A fluid drive element comprising a housing forming a pump chamber, a drive element in said housing, pump means within said pump chamber actuated by said drive element, a driven shaft in said housing, a fluid coupling for driving said driven shaft from said drive shaft, and means for supplying said fluid pressure to said fluid coupling to effect a change in the angular relationship between said drive and said driven shafts in accordance with the speed of rotation of said drive shaft.

4. A fluid drive mechanism of the character described adapted for control of a gun turret fire control mechanism comprising a housing, a drive shaft extending into said housing, fluid pump means within said housing and operably connected with said drive shaft, a driven shaft extending into said housing, a fluid chamber fixed to and rotatable with one of said shafts, a vane movable in said fluid chamber and fixed to and rotatable with the other of said shafts, and means for supplying fluid pressure from said pump means into the space between said vane and said fluid chamber to effect an increased speed of operation of said driven element upon increase in the speed of said drive element.

5. A fluid drive mechanism of the character described comprising a housing, a drive shaft in said housing, a driven shaft in said housing, fluid pressure means operable from said drive shaft and adapted to develop a fluid pressure varying in relation to the speed of operation of said drive shaft, a fluid chamber rotatably mounted in said housing and secured to one of said shafts, a vane within said chamber rotatable with respect thereto and fixed with relation to the other of said shafts, and means for supplying said fluid pressure selectively to opposite sides of said vane in accordance with the direction of rotation of said drive shaft to effect corresponding rotation of said driven shaft with an added increment of angular velocity over that of the drive element.

6. A fluid drive mechanism of the character described comprising a housing, a drive shaft in said housing, a driven shaft in said housing, fluid pressure means operable from said drive shaft and adapted to develop a fluid pressure varying in relation to the speed of operation of said drive shaft, a fluid chamber rotatably mounted in said housing and secured to one of said shafts, a vane within said chamber rotatable with respect to a neutral position therein and fixed with relation to the other of said shafts, and means for supplying said fluid pressure selectively to opposite sides of said vane in accordance with the direction of rotation of said drive shaft to effect corresponding rotation of said driven shaft away from its neutral position with an added increment of angular velocity over that of the drive element.

7. A fluid drive mechanism of the character described comprising a housing, a drive shaft in said housing, a driven shaft in said housing, fluid pressure means operable from said drive shaft and adapted to develop a fluid pressure varying in relation to the speed of operation of said drive shaft, a fluid chamber rotatably mounted in said housing and secured to one of said shafts, a vane within said chamber rotatable with respect to a neutral position therein and fixed with relation to the other of said shafts, means for supplying said fluid pressure selectively to opposite sides of said vane in accordance with the direction of rotation of said drive shaft to effect corresponding rotation of said driven shaft away from its neutral position with an added increment of angular velocity over that of the drive element, and resilient means tending to restore said vane to its neutral position when displaced in either direction therefrom.

8. A fluid drive of the character described comprising a housing, a drive shaft and a driven shaft within said housing, fluid pump means operated from said drive shaft developing a fluid pressure varying in relation to the speed of rotation thereof, a closed fluid chamber, a vane within said chamber, said chamber and said vane being adjustable with respect to each other but each fixed respectively to one of said shafts, means for supplying fluid under pressure from said pump means to said chamber to effect the driving of said driven shaft from said drive shaft in predetermined phase relation depending upon the speed of rotation thereof.

9. A fluid drive of the character described comprising a housing, a drive shaft and a driven shaft within said housing, fluid pump means operated from said drive shaft developing a fluid pressure varying in relation to the speed of rotation thereof, a closed fluid chamber, a vane within said chamber, said chamber and said vane being adjustable with respect to each other but each fixed respectively to one of said shafts, means for supplying fluid under pressure from said pump means to said chamber to effect the driving of said driven shaft from said drive shaft in predetermined phase relation depending upon the speed of rotation thereof, and means for restoring the initial relation of said drive and driven shafts upon decrease of said fluid pressure.

10. A fluid drive of the character described comprising a housing, a drive shaft and a driven shaft within said housing, fluid pump means operated from said drive shaft developing a fluid pressure varying in relation to the speed of rotation thereof, a closed fluid chamber, a vane within said chamber, said chamber and said vane being adjustable with respect to each other but each fixed respectively to one of said shafts, means for supplying fluid under pressure from said pump means to said chamber to effect the driving of said driven shaft from said drive shaft in predetermined phase relation depending upon the speed of rotation thereof, and resilient means having one part rotatable with said drive shaft and another rotatable with said driven shaft for effecting return of said shafts to their initial relation in the absence of supply of fluid pressure to said chamber.

11. Fluid drive means of the character described comprising a housing, a drive shaft and a driven shaft in said housing, a pump operated from said drive shaft for developing a fluid pressure varying in relation to the speed of rotation thereof, a fluid chamber within said housing and fixed with respect to one of said shafts, a vane within said chamber and fixed with respect to the other of said shafts, means for supplying fluid pressure from said pump selectively to one side or the other of said vane to effect a predetermined change in the phase relation of said driven shaft with respect to said drive shaft in accordance with the speed of rotation thereof, and stop means within said chamber for limiting the maximum change in phase relation produced by the supply of said fluid pressure.

12. A fluid driving unit comprising a drive shaft, a driven shaft, fluid coupling means for driving said driven shaft in predetermined speed relation with respect to said drive shaft, said coupling means including driving and driven members and a fluid forming the effective driving connection therebetween, means driven by said drive shaft for developing a fluid pressure varying in relation to the speed of said drive shaft, and means for introducing said fluid pressure into said fluid coupling means to change the phase relation between said drive and driven shafts in accordance with changes in the speed of said drive shaft.

13. A fluid drive unit comprising a drive shaft, a driven shaft, fluid coupling means for driving said driven shaft in predetermined speed relation with respect to said drive shaft, said coupling means including driving and driven members and a fluid forming the effective driving connection therebetween, means driven by said drive shaft for developing a fluid pressure varying in the same sense as variations in the speed of said drive shaft, and means for introducing said fluid pressure into said fluid coupling means to advance or retard the phase relation between said driving and driven members in accordance with increase or decrease in the speed of said drive shaft.

LARENCE E. RAUSENBERGER.

REFERENCES CITED

The following references are of record in the file of this patent:

UNITED STATES PATENTS

| Number | Name | Date |
|---|---|---|
| 1,590,772 | Moore | June 29, 1926 |
| 2,165,658 | Schaeren | July 11, 1939 |
| 2,190,900 | Von Tavel | Feb. 20, 1940 |